United States Patent [19]

Caldwell, Jr. et al.

[11] 3,998,408
[45] Dec. 21, 1976

[54] REMOTE ELEVATED PLATFORM

[75] Inventors: Hamlin A. Caldwell, Jr., Stonington; Gerald M. Mayer, East Lyme, both of Conn.

[73] Assignee: The United States of America as represented by the Secretary of the Navy, Washington, D.C.

[22] Filed: Feb. 19, 1976

[21] Appl. No.: 659,458

[52] U.S. Cl. .............................. 244/138 R; 9/8 R; 244/153 R
[51] Int. Cl.² .......................................... B64D 1/02
[58] Field of Search ......... 244/33, 138 R, 153–155; 9/8 R, 9

[56] References Cited
UNITED STATES PATENTS

| | | |
|---|---|---|
| 2,382,442 | 8/1945 | Rich et al. ...................... 244/138 R |
| 2,470,783 | 5/1949 | Mead ................................ 9/9 |
| 2,570,549 | 10/1951 | Hansell ............................ 244/33 |
| 3,221,656 | 12/1965 | Sutten ............................ 244/138 R |
| 3,282,539 | 11/1966 | Wiant ............................ 244/138 R |
| 3,657,752 | 4/1972 | Davidson et al. .................. 9/9 |
| 3,787,013 | 1/1974 | McKenzie, Sr. ................. 244/155 R |
| 3,921,120 | 11/1975 | Widenhofer ........................ 9/8 R |
| R26,427 | 7/1968 | Jalbert ............................. 244/145 |

*Primary Examiner*—Trygve M. Blix
*Assistant Examiner*—Galen L. Barefoot
*Attorney, Agent, or Firm*—Richard S. Sciascia; Arthur A. McGill; Prithvi C. Lall

[57] ABSTRACT

A remote elevated platform (REP) for positioning a payload from an aircraft and maintaining its position unattended, comprises a lifting body, a payload designed to be suspended from the lifting body, a tether line and a mooring system. The platform is dropped from the aircraft and the lifting body is deployed by opening it up by means of a static line or a barometric device. The mooring system is then released and it starts falling freely but attached to the tether line. The mooring line then strikes the surface and fixes itself in the ground. In a body of water, a float and sea anchor is deployed instead.

6 Claims, 2 Drawing Figures

REMOTE ELEVATED PLATFORM

STATEMENT OF GOVERNMENT INTEREST

The invention described herein maybe manufactured and used by or for the Government of the United States of America for governmental purposes without the payment of any royalties thereon or therefor.

BACKGROUND OF THE INVENTION

This invention relates to elevated platform systems and more particularly to a remote elevated platform system, hereinafter called REP system, for maintaining a payload unattended at an altitude of several thousand feet in a fixed or slowly moving position using wind for power. Current methods of elevating payloads and maintaining them in position have some limitations and disadvantages associated therewith. As an example, a manned aircraft used for this purpose is relatively expensive and endurance of such a system is limited to the time the aircraft can remain on station and involves the use of air crew. A remotely piloted vehicle (RPV) has similar limitations as a manned aircraft system except that no air crew is required. Furthermore, the use of satellites for such a purpose is very expensive. Another method using tethered ballons has the disadvantage of having too high a volume to payload ratio and the use of free ballons has the limitation that such systems drift with wind. Use of kites suffers from the limitation that they must be launched from the surface by a crew. It is thus desirable to have a REP system which does not suffer from the limitations and disadvantages of the systems ennumerated above.

SUMMARY OF THE INVENTION

The objects and advantages of the present invention are accomplished by utilizing a remote elevated platform system, a REP system, for positioning a payload from an aircraft and maintaining it in that position unattended. The platform includes a lifting body, a payload designed to be suspended from the lifting body, a tether line and a mooring system, all elements being secured in a housing. The REP system is dropped from an aircraft and the lifting body is deployed by opening it up by means of a static line or a barometric device. The mooring system is then released and it starts falling freely but attached to the tether line. The mooring line then strikes the surface and fixes itself in the earth. Alternatively, a float and a sea anchor are deployed in case the surface is that of a body of water.

An object of this invention is to have a remote elevated platform system, REP system, which permits a payload to be positioned at an altitude of several thousand feet by air drop.

Another object of this invention is to have a REP system which remains aloft unattended using wind power.

Still another object of this invention is to have a REP system which is relatively inexpensive and which does not require any air crew.

Still another object of subject invention is to have a REP system which does not have a large volume to payload ratio.

Another object of subject invention is to have a REP system which does not drift with wind.

An additional object of subject invention is to have a REP system which does not require a crew to launch it from the surface.

Other objects, advantages and novel features of the invention will become apparent from the following detailed description of the invention when considered in conjunction with the accompanying drawings wherein:

DESCRIPTION OF A PREFERRED EMBODIMENT

Figure 1:
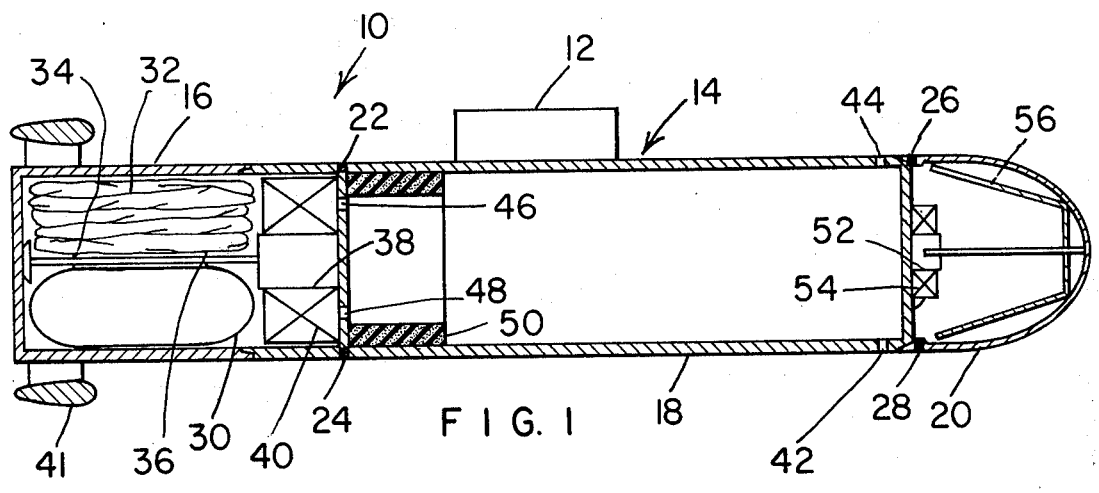
FIG. 1 is a cross sectional view of a remote elevated platform system according to the teachings of subject invention.

Refering to the drawings wherein like reference characters designate like part throughout the several figures and more particularly to FIG. 1 thereof, a crossectional view of a remote elevated platform system, REP system, built according to the teachings of subject invention is shown. The platform 10 comprises a clamplike structure 12 by which the REP can be detachably mounted on a moving vehicle such as an airplane on a wing thereof. The platform 10 further includes housing 14 which comprises three parts, i.e. Aft shell 16, main shell 18 and the nose shell 20. Shells 16 and 18 are attached to each other by using small explosive bolts 22 and 24 and shells 18 and 20 are attached to each other by means of small explosive bolts 26 and 28, thus forming overall housing 14. Payload 30 attached to a parafoil 32 using mechanical means such as ropes or strings 34 and 36 is housed in shell 16 which also houses pressure release or barometric switch 38 and spool 40 having a line, made of a material such as KEVLAR (Fiber B) or its commercially available equivalent, is mounted thereon. A ring shroud 41 is attached to the tail end of shell 16 which provides sufficient drag during the descent of the assembly in the air. Main shell 18 is provided with two flapper valves 42 and 44 and vents 46 and 48 as shown in FIG. 1. Shell 18 is also lined with a flotation material 50 at the end adjacent shell 16. Shell 20 houses an impact release switch 52, a spool 54 having another line, preferrably of KEVLAR (Fiber B) or equivalent, mounted thereon and a sea anchor 56. It should be noted that all elements used in the making of the REP system 10, such as parafoil 32, sea anchor 56, pressure release switch 38 and impact release switch 52 are commonly known elements and are commercially available and do not need any further explanation. REP assembly 10 is mounted on an aircraft which is used to carry it to the place of its launching.

In operation, the REP assembly is released at the desired deployment site from an altitude in excess of a predetermined height, approximately 10,000 feet. The release mechanism from the aircraft energizes a barometric switch 38 which will later separate the Aft shell 16 from the main shell 18 when the assembly descends to an altitude of 10,000 feet. During the descent from the launch altitude down to 10,000 feet, the descent is stabilized in a nose down attitude by the drag at the Aft end of shell 16 caused by ring shroud 41. Upon reaching an altitude of 10,000 feet, the barometric switch activates a release mechanism which breaks the mechanical bond between Aft shell 16 and main shell 18. Shroud ring 40 creates aerodynamic drag which causes Aft shell 16 to separate from main shell 18. Shell 16 upon separation pulls parafoil 32 from its stowed position and falls freely to the surface. Parafoil 32 now being free from Aft shell 16 deploys fully and begins a gliding descent. Payload 30 is attached to the parafoil by rigging lines 34 and 36 and to a free spooling coil of KEVLAR (Fiber B) which is long enough to serve as a tether line when the device is fully deployed. The entire front part of the assembly, i.e., Fore shell 20 including the coil 54 of KEVLAR (Fiber B) falls freely to the surface, paying out KEVLAR line as it falls. The end of tether line on spool 40 is firmly secured to Aft shell 18. On making contact with the water surface, Fore shell or nose shell 20, housing the nose is separated from main shell 18 by means of an impact release switch 52. Main shell 18 then remains on the surface of the water and functions as a spar buoy. Nose shell 20 falls away and sinks, allowing a folded drogue or sea anchor 56 to deploy. Sea anchor 56 settles to a depth of say 100 feet or so, paying out line from a 100 feet coil of KEVLAR wound on spool 54 attached to the bottom of main shell 18. The sea anchor 56 remains attached to the surface rope i.e. main shell 18 and retards its deployment through the water. Main shell 18 is provided with sufficient mass to avoid being lifted from the water by dynamic lift forces generated by parafoil 32. The required mass is provided by flooding main shell 18 with sea water admitted by one-way flapper valves 42 and 44 at the base of main shell 18. Entrained air exits from main shell 18 through vent holes 46 and 48 at the top of main shell 18. Floatation material 50 inside main shell 18 provides buoyancy just sufficient to keep shell 18 afloat when fully flooded. The entire volume inside main shell 18 is flooded with sea water. Main shell 18 continues to float in a very low free board condition, and serves as a tether point to provide the restraining force necessary to keep parafoil 32 afloat. The lifting component of the force is resisted by the mass of the water trapped in main shell 18 while the drag component of the force is resisted by the underwater drogue or sea anchor 56. It is to be noted that the design and dimensions of shells 16, 18, and 20 are determined by the size of payload 30 which can be any type of equipment such as a radio frequency relay for providing a data link between a surface ship and a distant underwater acoustic sensor. Different payload configurations can perform a multitude of other functions and are useful in Navy application involving data transfer, communication etc.

Figure 2:
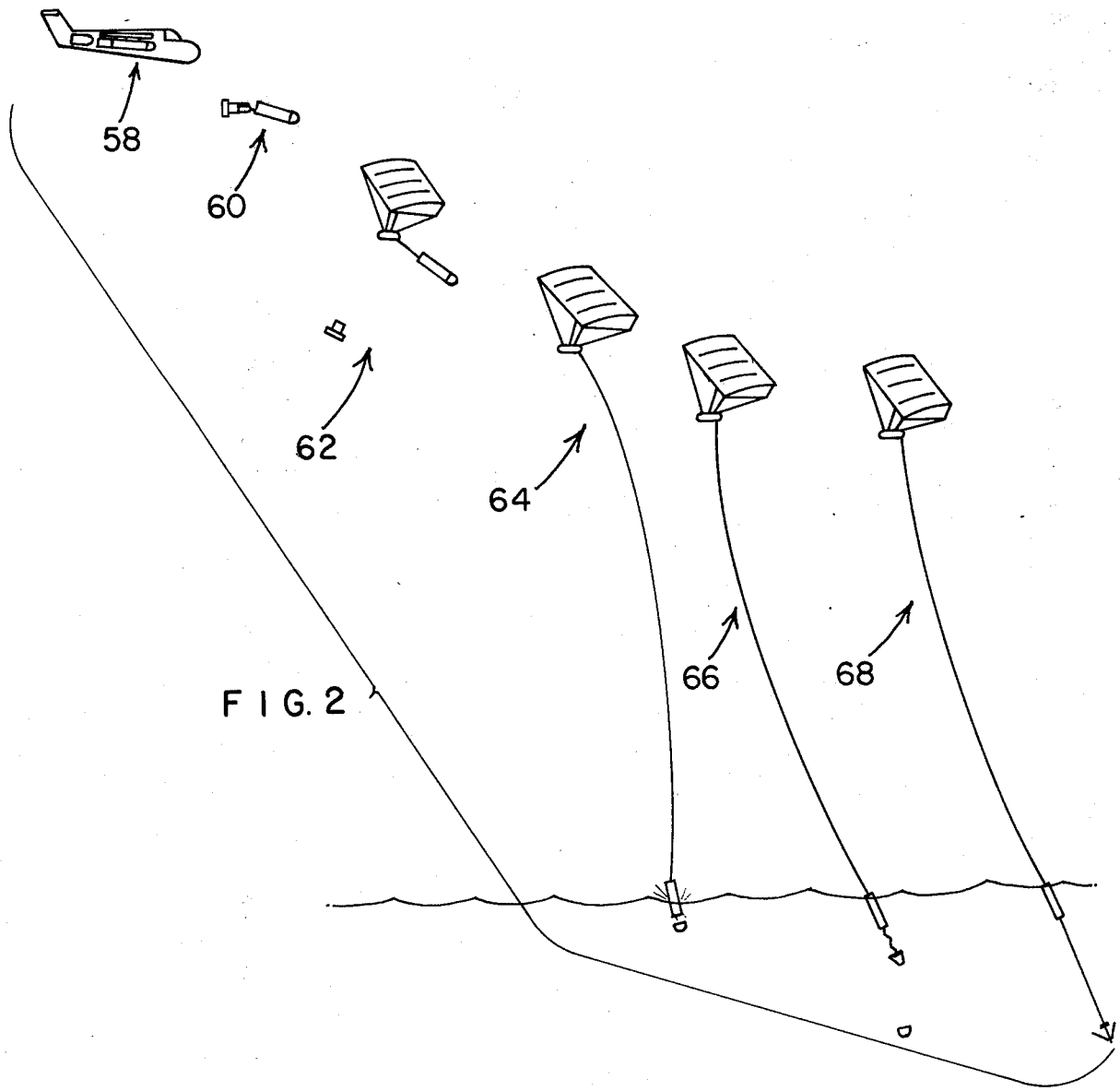
FIG. 2 schematically represents different stages during the deployment of the REP system.

FIG. 2 shows the deployment sequence wherein 58 shows the REP assembly being transported to the deployment site on an aircraft wing station. 60 shows the REP assembly shortly after release, with the Aft shell 16 separating and beginning to pull the parafoil 32 from its stowed position. 62 shows the parafoil 32 and payload 30 fully deployed, with the Fore or nose shell 20 beginning to freefall, paying out tether line as it falls. The Aft shell 16 having served its function is discarded and is shown falling into the sea. 64 shows parafoil 32 and payload 30 at a low altitude resulting from its stable gliding descent and shows the Fore or nose shell 20 entering the water with the nose section separating after being freed by the impact release switch mechanism 52. 66 shows parafoil 32 in transistion from gliding flight to tether flight, and also shows the drogue or sea anchor 56 beginning to sink, paying out attachment line as it settles. Simultaneously, the surface buoy or main shell 18 is filling with water and shell 20 is sinking to the bottom. 68 shows REP assembly 10 in fully deployed operation condition, with the parafoil 32 in stable tether flight, the buoy fully flooded and sea anchor at full operating depth.

Obviously, many modifications and variations of the present invention are possible in the light of the above teachings. As an example, the size of the REP assembly can be changed so as to accommodate various types of payloads. Furthermore, the mechanical connection between different parts of the housing, i.e., shells 16, shell 18, and 20 can be varied by using arrangements other than explosive bolts. Furthermore, the choice of materials for the fabrication of various components could be varied without deviating from the teachings of subject invention. It is therefor understood that within the scope of the appended claims the invention may be practiced otherwise than specifically described.

We claim:

1. A remote elevated platform system for positioning a payload at a high altitude and maintaining the position thereof unattended, which comprises:
   a housing including a plurality of detachably secured shells;
   a parafoil being stowed in a first shell of said plurality of shells, said parafoil being flexibly attached to the payload in said first shell;
   a pressure release switching means being housed in said first shell, said pressure release switching means being energizable by a preselected barometric pressure value;
   a first spool being housed in said first shell;
   a first tether line being mounted on said first spool having the first end thereof being connected to the payload;
   a second shell of said plurality of shells of said housing detachably secured to said first shell, said second shell being connected to the second end of said first tether line;
   a third shell of said plurality of said shells of said housing detachably secured to said second shell;
   an impact switching means being housed in said third shell;
   a second spool being housed in said third shell;
   a second tether line being mounted on said second spool having the first end thereof being connected to said second shell; and
   an anchor means being housed in said third shell, said anchor means being connected to the second end of said second tether line.

2. The remote elevated platform system of claim 1 wherein said first shell is being fitted with a ring shroud at the tail end thereof for keeping said first shell along a selected attitude during a descent thereof;

3. The remote elevated platform system of claim 2 wherein said second shell includes a plurality of flapper valves for flooding said second shell with sea water.

4. The remote elevated platform system of claim 3 where said second shell further includes a plurality of vents at the top thereof for an easy exit of trapped air while said second shell allowing sea water to enter therein.

5. The remote elevated platform of claim 4 wherein the inside of said second shell is being lined with a floatable material.

6. The remote elevated platform of claim 1 wherein said plurality of shells of said housing are detachably secured by using a plurality of explosive bolts.

* * * * *